(12) United States Patent
Kim et al.

(10) Patent No.: US 7,412,727 B2
(45) Date of Patent: Aug. 12, 2008

(54) MEDIA STREAMING HOME NETWORK SYSTEM AND METHOD FOR OPERATING THE SAME

(75) Inventors: Pan Su Kim, Kyunggi-do (KR); Young Hoon Roh, Seoul (KR); Sang Mahn Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 674 days.

(21) Appl. No.: 10/917,303

(22) Filed: Aug. 13, 2004

(65) Prior Publication Data

US 2005/0188096 A1 Aug. 25, 2005

(30) Foreign Application Priority Data

Feb. 19, 2004 (KR) ...................... 10-2004-0010943

(51) Int. Cl.
  *G06F 7/04* (2006.01)
  *H04L 9/32* (2006.01)
  *H04N 7/16* (2006.01)
(52) U.S. Cl. .............................. 726/29; 726/28; 726/30; 709/231; 709/238
(58) Field of Classification Search ........................ None
See application file for complete search history.

(56) References Cited

U.S. PATENT DOCUMENTS

| | | | | |
|---|---|---|---|---|
| 6,182,094 | B1 * | 1/2001 | Humpleman et al. | 715/513 |
| 6,288,716 | B1 * | 9/2001 | Humpleman et al. | 715/733 |
| 6,603,488 | B2 * | 8/2003 | Humpleman et al. | 715/771 |
| 6,735,619 | B1 * | 5/2004 | Sawada | 709/212 |
| 7,349,967 | B2 * | 3/2008 | Wang | 709/227 |

(Continued)

FOREIGN PATENT DOCUMENTS

KR 20030093869 12/2003

(Continued)

OTHER PUBLICATIONS

Ruth Jenkins, "Clashing with caching?", Ariadne Issue 21, pp. 1-9, Sep. 20, 1999, retrieved from http://www.ariadne.ac.uk/issue21/web-cache/.

(Continued)

*Primary Examiner*—Christian LaForgia
(74) *Attorney, Agent, or Firm*—Greenblum & Bernstein, P.L.C.

(57) ABSTRACT

A media streaming home network system including at least one media client, which requests for a media streaming service through the Internet under a dynamic or static Internet Protocol (IP) environment, a media server, which detects network address information from the media client or a gateway connected to the media client, performs an access authentication process for the media client, and provides the media streaming service requested by the media client when the media client is authenticated, and a control server, which relays control messages transmitted between the media client and the media server, and provides the network address information of the media client to the media server. The media server can perform a process for authenticating the media client, using routing table information of the media client, without exchange of authentication information at an application level, even when both the media server and the media client use dynamic Internet Protocols (IPs), so that it is possible to rapidly and conveniently achieve the client authentication, while constructing a firm security system.

12 Claims, 4 Drawing Sheets

U.S. PATENT DOCUMENTS

| | | | |
|---|---|---|---|
| 2001/0038392 A1* | 11/2001 | Humpleman et al. | 345/733 |
| 2002/0010798 A1 | 1/2002 | Ben-Shaul et al. | |
| 2002/0080753 A1* | 6/2002 | Lee | 370/338 |
| 2002/0080827 A1* | 6/2002 | Lee | 370/527 |
| 2002/0091801 A1 | 7/2002 | Lewin et al. | |
| 2002/0138437 A1 | 9/2002 | Lewin et al. | |
| 2003/0046580 A1 | 3/2003 | Taniguchi et al. | |
| 2006/0095471 A1* | 5/2006 | Krikorian et al. | 707/104.1 |

FOREIGN PATENT DOCUMENTS

| | | |
|---|---|---|
| WO | 02/054699 | 7/2002 |

OTHER PUBLICATIONS

English Language Abstract of Korean 2003-093869.

* cited by examiner

MEDIA STREAMING HOME NETWORK SYSTEM AND METHOD FOR OPERATING THE SAME

BACKGROUND OF THE INVENTION

1. Field of the Invention

The present invention relates to a media streaming home network system and a method for operating the media streaming home network system, and more particularly to a media streaming home network system and an operating method for the media streaming home network system, in which a server performs a process for authenticating a client, using routing table information of the client, without exchange of authentication information at an application level, even when both the server and the client use dynamic Internet Protocols (IPs), so that it is possible to rapidly and conveniently achieve the client authentication, while constructing a firm security system.

2. Description of the Related Art

Figure 1:
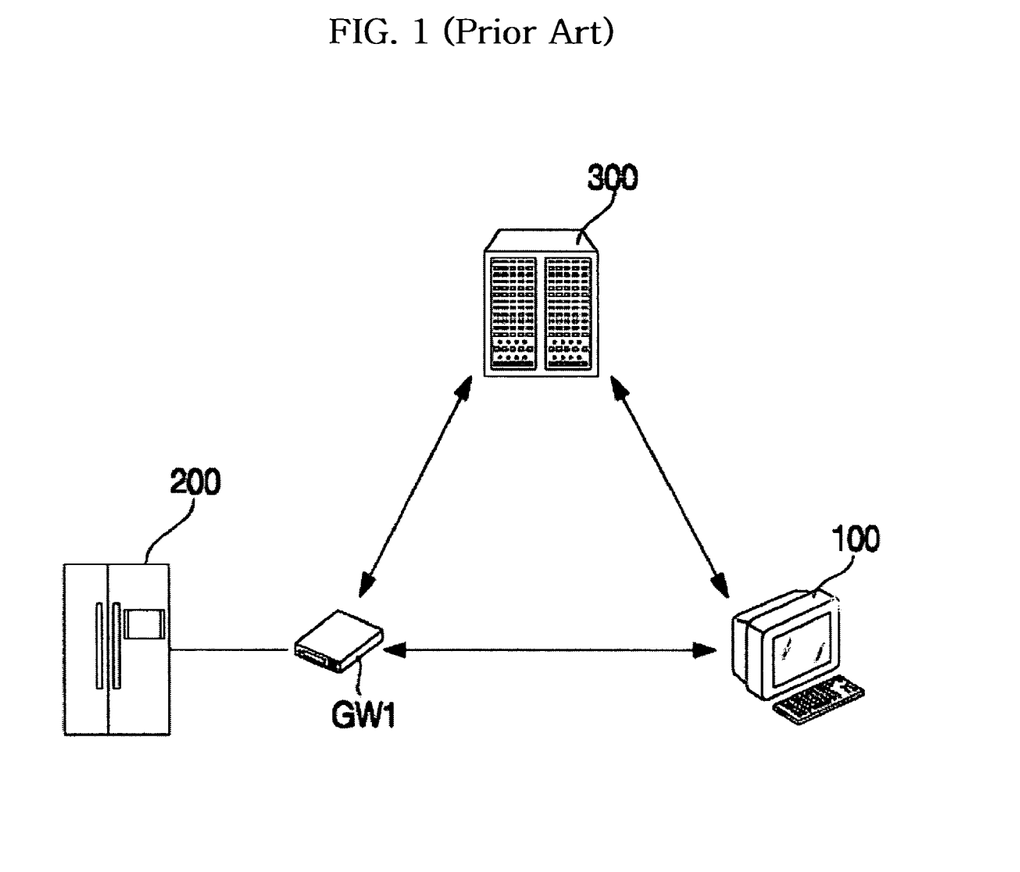
FIG. 1 is a schematic view illustrating a conventional media streaming home network system.

Referring to FIG. 1, a conventional home network system is schematically illustrated. This home network system will be described hereinafter with reference to FIG. 1.

Recently, construction of home network systems has been increased. Such a home network system is implemented by connecting a plurality of electric home appliances through a network installed in a home or building such that the electric home appliances are mutually controlled. In order to effectively perform such mutual control, one of the electric home appliances is set as a server, and the remaining electric home appliances are set as clients.

Meanwhile, where the client appliances have access to the Internet, it is possible for the server to provide media streaming services at the request of the client appliances. In this case, it is necessary to provide a function for performing a security authentication required for data transmission and reception between the server and the clients.

Where the conventional home network system illustrated in FIG. 1 has the above-mentioned functions, it may include at least one client appliance 10, a media server 20, and a control server 30.

When the user desires to receive a media streaming service, he accesses the media server 20 via the Internet through the client appliance 10, and requests the media server 20 to provide a multimedia data stream stored in the media server 20.

Control messages transmitted between the client appliance 10 and the media server 20 are relayed by the control server 30.

That is, the client appliance 10 accesses a web site operated by the control server 30 to download a web page from the web site, and requests the control server 30 to provide a media streaming service through the web page. In response to the request of the client appliance 10, the control server 30 transmits, to the media server 20, network address information including the IP address and port No. of the client appliance 10.

Upon receiving the network address information from the control server 30, the media server 20 compares the received network address information with network address information transmitted from the client appliance 10. Based on the result of the comparison, the media server 20 performs an authentication procedure for the client appliance 10.

This system is implemented under the condition in which the client appliance 10 uses a static Internet Protocol (IP) address. The static IP address of the client appliance 10 may be a network address assigned to the client appliance 10 by an Internet service provider (ISP) for a fee.

When the client appliance 10 initially accesses the control server 30, the network address information including the IP address and port No. of the client appliance 10 is stored in the control server 30.

The static IP address does not vary depending on the environment of the network. Accordingly, the network address information stored upon the initial access of the client appliance 10 to the control server 30 is also used in every subsequent access authentication procedure.

Generally, the client appliance 10 can be connected to the Internet, using a static IP address or dynamic IP address provided by an ISP.

Internet connection services using static IP addresses involve considerably high installation and maintenance costs, and a very low service speed as compared to the servicing expense. For this reason, most homes use Internet connection services using dynamic IP addresses.

Where the client appliance 10 uses the latter Internet connection services, it is assigned a new IP address whenever it is connected to the Internet.

For this reason, the IP address newly assigned to the client appliance 10 is different from the IP address previously inputted to the media server 20 and control server 30. As a result, the media server 20 cannot perform an authentication process for the client appliance 10, using the IP address stored in the control server 30.

In order to solve this problem, whenever the client appliance 10 is connected to the control server 30, the authentication process for the client appliance 10 must be carried out by manually inputting an ID and password at an application level by the user. However, implementation of a system for such a security authentication is complex and expensive.

SUMMARY OF THE INVENTION

The present invention has been made in view of the above-mentioned problems incurred in the related art, and an object of the invention is to provide a media streaming home network system and a method for operating the media streaming home network system, in which a server performs a process for authenticating a client, using routing table information of the client, without exchange of authentication information at an application level, where both the server and the client use dynamic IPs.

Another object of the invention is to provide a media streaming home network system and a method for operating the media streaming home network system, in which client authentication can be rapidly and conveniently carried out, using routing information of a server and a client, without a requirement for the user to input an ID and a password, so that a firm security system can be constructed.

In accordance with one aspect, the present invention provides a media streaming home network system comprising: at least one media client, which requests for a media streaming service through the Internet under a dynamic or static Internet Protocol (IP) environment; a media server, which detects network address information from the media client or a gateway connected to the media client, performs an access authentication process for the media client, and provides the media streaming service requested by the media client when the media client is authenticated; and a control server, which relays control messages transmitted between the media client and the media server, and provides the network address information of the media client to the media server.

The media client can be connected to the Internet in a wired or wireless manner, using a dynamic IP or static IP, so as to make a request for media streaming services. The media client 100 may be a personal computer, a notebook computer, a mobile communication terminal, a personal digital assistant (PDA), a web pad, etc.

Where the media client uses a static IP, it can directly access the media server, which is connected to the Internet. However, where the media client uses a dynamic IP, it can access the media server through a gateway.

The media server not only performs a home server function for performing control operations for electric home appliances connected to a network constructed in a home or building, but also performs a contents server function for providing multimedia data requested by the media client.

The control server relays signals transmitted between the media client and the media server. The media client accesses a web page driven on the control server, and requests the control server to provide a media streaming service through the web page.

Upon receiving the request of the media client, the control server transmits, to the media server, network address information including the IP address and port No. of the media client.

Where the media client uses a dynamic IP, the media server accesses the gateway, to which the media client is connected, and extracts the network address information of the media client from routing table information stored in the gateway.

The media server then compares the network address information extracted from the gateway of the media client with the network address information of the media client received from the control server, and performs an authentication process for the media client, based on the result of the comparison. When the media client is authenticated, the media server transmits multimedia data requested by the media client.

Thus, even where the media client uses a dynamic IP, the media server can perform an authentication process for the media client, using the routing information of the media client, without requiring exchange of authentication information at an application level. Accordingly, it is possible to rapidly and conveniently achieve the authentication of the media client.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, embodiments of a media streaming home network system and an operating method for the media streaming home network system according to the present invention will be described in detail with reference to the annexed drawings.

Although there may be various embodiments, the following description will be given in conjunction with the most preferred embodiment. In the following description, no description will be given of the basic configuration of the media streaming home network system because the basic configuration is identical to that of the above-mentioned conventional media streaming home network system.

Figure 2:
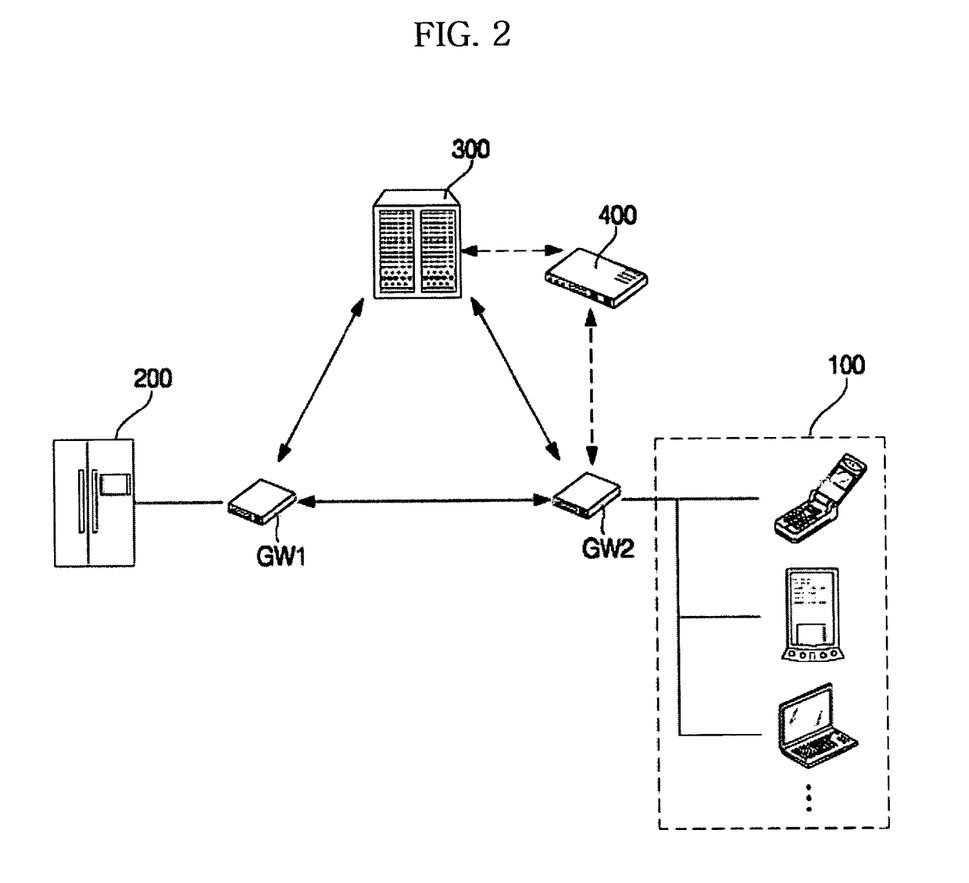
FIG. 2 is a schematic view illustrating a media streaming home network system according to the present invention.
Figure 3:
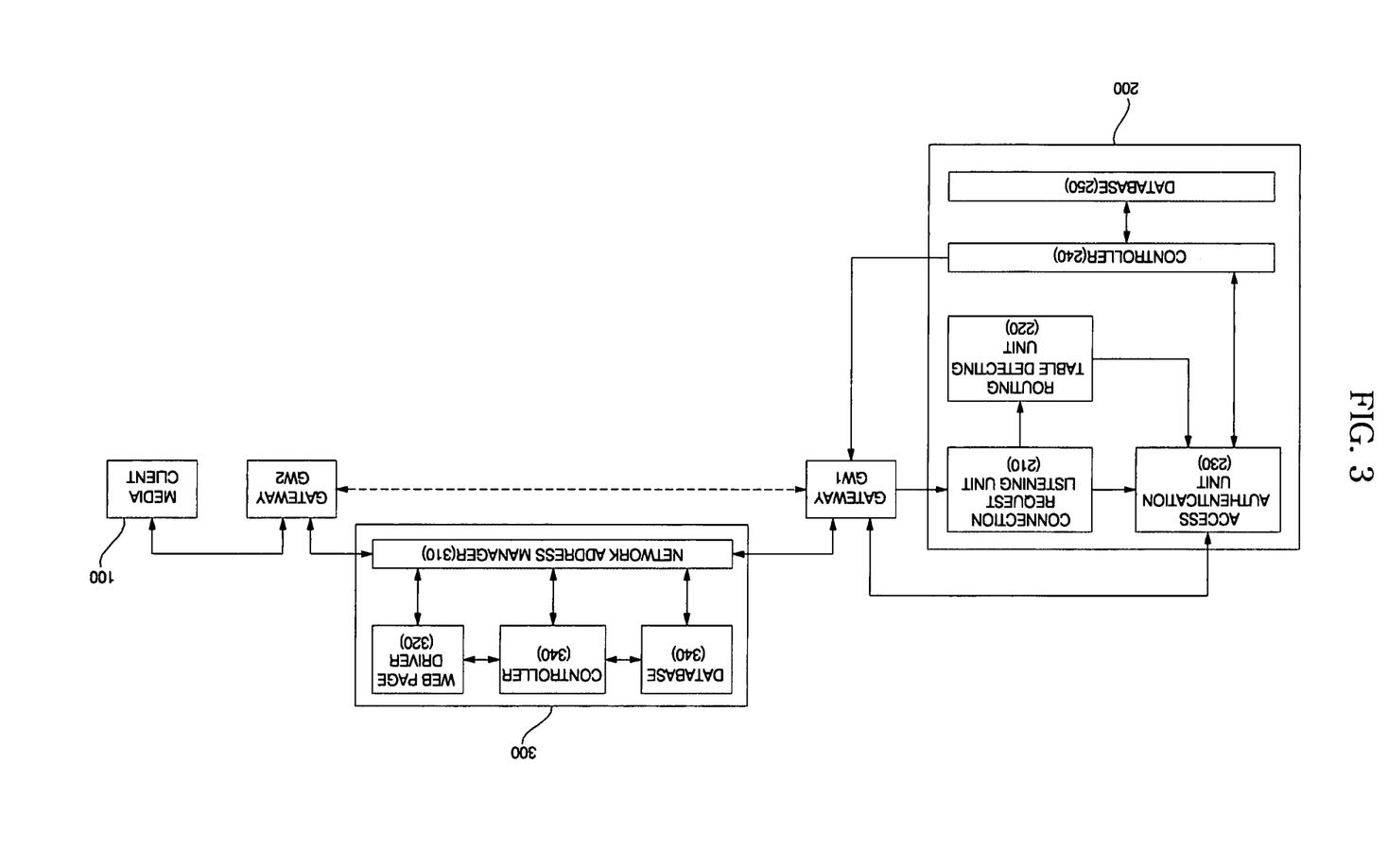
FIG. 3 is a block diagram illustrating a detailed configuration of the media streaming home network system according to the present invention.

FIG. 2 is a schematic view illustrating the media streaming home network system according to the present invention. FIG. 3 is a block diagram illustrating a detailed configuration of the media streaming home network system according to the present invention.

As shown in FIG. 2, the media streaming home network system of the present invention includes at least one media client 100, which can be connected to the Internet in a wired or wireless manner, using a dynamic IP or static IP, so as to make request for media streaming services. The media client 100 may be a personal computer, a notebook, a mobile communication terminal, a personal digital assistant (PDA), a web pad, etc.

Where the media client 100 uses a static IP, it can directly access a media server 200 (to be described hereinafter), which is connected to the Internet. However, where the media client 100 uses a dynamic IP, it can access the media server 200 through gateways GW1 and GW2.

Where the media client 100 is connected to the Internet in a wireless manner, it can access a control server 300 through a terminal relay server 400, which is connected to the Internet.

The terminal relay server 400 not only relays data transmitted between terminals in a wireless Internet environment, but also relays data transmitted between each terminal and a server.

When the terminal relay server 400 is connected with the media client 100, it receives, from the media client 100, network address information including the IP address and port No. of the media client 100, along with a control message inputted to the media client 100. Subsequently, the terminal relay server 400 transmits the received information and message to the control server 300.

The media server 200 transmits/receives signals to/from a plurality of electric home appliances (not shown) connected to a network constructed in a home or building, and performs control operations for the electric home appliances, based on the transmitted/received signals. That is, the media server 200 performs a home server function. The media server 200 also performs a contents server function for providing multimedia data requested by an external client, which may be the media client 100.

That is, the media server 200 stores detailed information about operation statuses of the media client 100 and each electric home appliance, such as standby, proceeding and completion of operation, and detailed parameters of activated intrinsic functions of each electric home appliance. The media server 200 also stores and manages multimedia data streams to be supplied to the media client 100.

As shown in FIG. 3, the media server 200 includes a connection request listening unit 210 for listening for a connection request of the media client 100 transmitted from the control server 300, and a routing table detecting unit 200 for extracting a connection IP address, based on routing table information stored in the gateway GW2 connected to the media client 100 in a dynamic IP environment.

The connection request listening unit 210 of the media server 200 simultaneously receives, from the control server 300, a connection request signal to request transmission of multimedia data at the request of the media client 100, and the network address information of the media client 100.

Where the media client 100 uses a dynamic IP, the routing table detecting unit 220 extracts the IP address of the media client 100 from the gateway GW2 connected to the media client 100.

The media server 200 also includes an access authentication unit 230 for performing an authentication process for the media client 100, based on the IP address of the media client 100.

Where the media client 100 uses a static IP, the access authentication unit 230 directly accesses the media client 100 to perform an authentication process.

On the other hand, where the media client 100 uses a dynamic IP, the access authentication unit 230 performs an authentication process for the media client 100 by comparing the IP address of the media client 100 extracted by the routing table detecting unit 220 with the network address information of the media client 100 transmitted from the control server 300.

Generally, the media server 200 has an environment in which the media server 200 is connectable to the Internet, using a dynamic IP. The media server 200 transmits/receives data to/from the control server 300 and media client 100 via the gateway GW1.

The media server 200 further includes a database 250 for storing software for home networking of the electric home appliances, and multimedia data to be used for media streaming services.

The media server 200 further includes a controller 240 for generating a control signal for home networking of each electric home appliance, and providing a media streaming service to the media client 100 in response to a control message transmitted from the control server 300 under the condition in which the access authentication of the media client 100 has been acquired.

After authentication of the media client 100, the controller 240 of the media server 200 retrieves, from the database 250, multimedia data requested by the media client 100, and transmits the retrieved multimedia data to the media client 100.

For the transmission of multimedia data, the media server 200 also includes a communication module (not shown) adapted to perform data transmission and reception with respect to the media client 100.

The communication module may be implemented in a wired or wireless manner determined depending on the type of the network, through which the media server 200 and media client 100 are connected.

Thus, the media server 200 acquires the network address information of the media client 100 transmitted from the control server 300, performs an access authentication process for the media client 100, based on the acquired network address information, and then provides a media streaming service to the authenticated media client 100.

The control server 300 includes a network address manager 310 for managing network address information including the IP address and port No. of the media client 100, and transmitting the network address information to the media server 200, and a web page driver 320 for driving a web page to allow the media client 100 to input a control message through the web page.

Accordingly, under the condition in which the media client 100 is connected to the control server 300, the media client 100 can input a control message to request a media streaming service through the web page driven on the control server 300 by the web page driver 320.

In this case, the network address manager 310 acquires network address information including the IP address and port No. of the media client 100, and transmits the acquired network address information to the media server 200.

The control server 300 also includes a controller 330 for performing a signal flow control operation to transmit a control message, inputted through the web page, to the media server 200, and a database 340 for storing system information and network status information of the media server 200, which is connected to the control server 300 via the Internet.

Accordingly, where the media client 100 uses a static IP, the media server 200 directly accesses the media client 100, using the IP address of the media client 100 transmitted from the control server 300, and performs an authentication process for the media client 100.

On the other hand, where the media client 100 uses a dynamic IP, the routing table detecting unit 220 of the media server 200 accesses the gateway GW2, which is connected to the media client 100, and extracts the access IP address of the media client 100, based on the routing table information of the media client 100 stored in the gateway GW2.

Accordingly, where the media client 100 uses a dynamic IP, it is preferred that the network address information, which is transmitted from the control server 300 to the media server 200, include information about the gateway, to which the media client 100 requesting a media streaming service is connected.

Where the media client 100 uses a dynamic IP, the media server 200 cannot directly acquire, from the media client 100, the IP address of the media client 100.

For this reason, the media server 200 accesses the gateway GW2, which is connected to the media client 100, and extracts the IP address information of the media client 100 from the routing table information of the gateway GW2.

When the IP address of the media client 100 extracted by the media server 200 corresponds to the network address information of the media client 100 transmitted from the control server 300, the access authentication unit 230 authenticates the access of the media client 100, and transmits multimedia data stored in the database 250.

The control server 300 stores the network address information including the final IP address and final port No. of the media client 100, which accesses the control server 300 through the web page.

Accordingly, even when the IP address or port No. of the media client 100 varies while the media client 100 attempts to access the media server 200, the varied IP address or port No. is automatically transmitted to the media server 300. Thus, the efficiency of the access authentication of the media client 100 increases.

Figure 4:
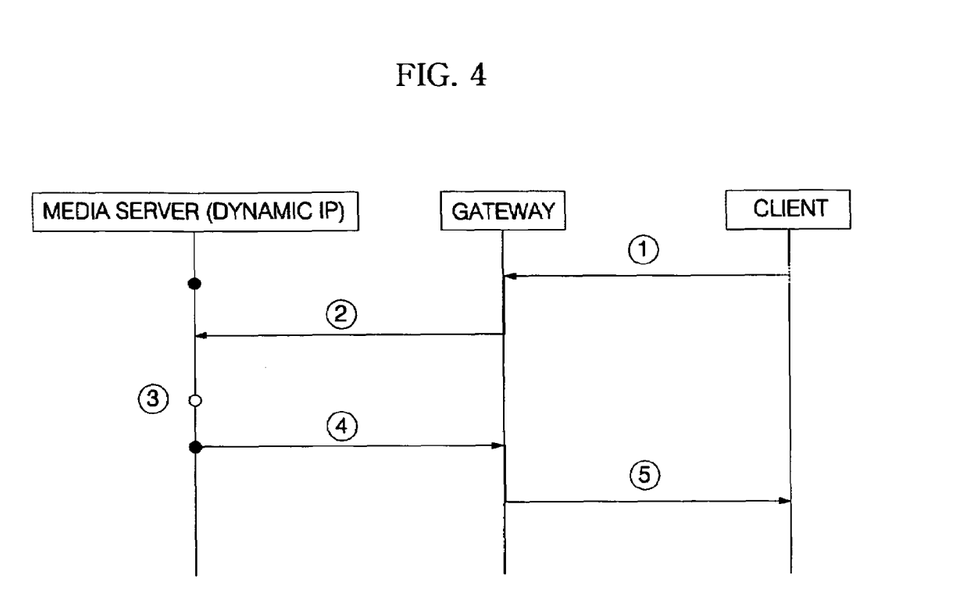
FIG. 4 is a signal flow diagram illustrating a procedure for operating the media streaming home network system in accordance with the present invention.
Figure 5:
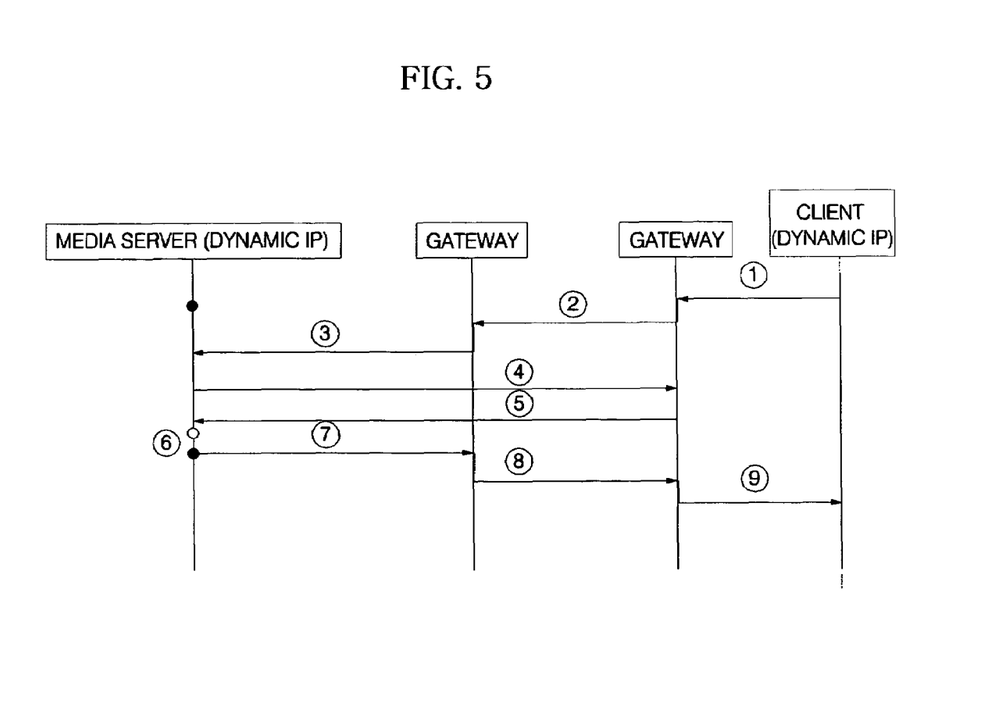
FIG. 5 is a signal flow diagram illustrating another procedure for operating the media streaming home network system in accordance with the present invention.

Referring to FIGS. 4 and 5, a method for operating the media streaming home network system having the above-described configuration according to the present invention is illustrated. FIG. 4 is a signal flow diagram illustrating a procedure for operating the media streaming home network system in accordance with the operating method of the present invention where the media client uses a static IP. FIG. 5 is a signal flow diagram illustrating a procedure for operating the media streaming home network system in accordance with the operating method of the present invention where the media client uses a dynamic IP.

First, the operating method will be described in conjunction with the case in which the media client uses a static IP. Where the media client desires to receive a media streaming service, it accesses the web site operated by the control server to download a web page from the web site, and requests the control server to provide a media streaming service through the web page, as shown in FIG. 4.

In response to the request of the media client, the control server transmits, to the media server, network address information including the IP address and port No. of the media client, and a control message inputted by the media client.

Based on the control message, the media server also directly receives IP address information from the media client (①, ②).

Typically, media servers installed in homes use dynamic IPs. Where the media server uses a dynamic IP as in such a case, it receives, through a gateway, the information transmitted from the media client.

Where the IP address of the media client received in the media server corresponds to the network address information transmitted from the control server (③), the media server authenticates the access of the media client, and provides a multimedia data stream to the media client ((④, ⑤)).

Now, the operating method will be described in conjunction with the case in which the media client uses a dynamic IP. Where the media client desires to receive a media streaming service, it accesses the web site operated by the control server to download the web page from the web site, and requests the control server to provide a media streaming service through the web page, as shown in FIG. 5.

If the media client is a wireless terminal adapted to perform data transmission and reception through the Internet in a wireless manner, the access of the media client to the control server is achieved through a terminal relay server, which is adapted to relay data transmitted between a terminal and a server.

When the media client requests the control server to provide a media streaming service in a state of being connected to the control server, the control server transmits, to the media server, network address information including the IP address and port No. of the media client, and a control message inputted by the media client (①, ②, ③)

Since both the media server and the media client use dynamic IPs, data transmission of the media server and media client is carried out through gateways. Accordingly, the network address information received by the control server includes information about the gateway, to which the media client requesting the media streaming service is connected.

The media server reads routing table information stored in the gateway connected with the media client requesting the media streaming service, and extracts the IP address of the media client.

For this IP address extraction, the media server also requests the gateway connected with the media client to send the routing table information (④). In response to the request of the media server, the gateway transmits the routing table information to the media server (⑤).

Where the IP address extracted from the routing table information corresponds to the network address information transmitted from the control server, the media server authenticates the access of the media client ((⑥)).

Finally, the media server provides a media streaming service to the access-authenticated media client ((⑦, ⑧, ⑨)).

Thus, it is unnecessary to exchange the network address information of the client appliance at the application level, not only in the case in which the media client uses a static IP, but also in the case in which the media client uses a dynamic IP.

Since the media server can perform an authentication process for the media client, based on the IP address acquired from the routing table information of the media client, it is possible to rapidly and conveniently achieve the authentication process, even where the media client uses a dynamic IP.

Accordingly, it is possible to achieve an enhancement in convenience in using the media streaming home network system.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0010943, filed on Feb. 19, 2004, the contents of which are herein expressly incorporated by reference in its entirety.

What is claimed is:

1. A media streaming home network system comprising:
   at least one media client which requests a media streaming service through the Internet in a dynamic Internet Protocol (IP) environment;
   a media server connected to the Internet which provides the media streaming service requested by the media client when the media client is authenticated; and
   a control server which relays control messages transmitted between the media client and the media server, and provides IP address information of the media client to the media server,
   wherein the media server compares an IP address detected by reading routing table information stored in a gateway connected to the media client with the IP address information provided by the control server, and authenticates an access of the media client to the media server when the detected IP address is identical to the IP address information provided by the control server.

2. The media streaming home network system according to claim 1, further comprising:
   a terminal relay server connected to the media client, wherein the terminal relay server receives network address information including an IP address of the media client, a port number of the media client and a control message inputted to the media client, and transmits the received information and message to the control server.

3. The media streaming home network system according to claim 2, wherein the media client is wirelessly connected to the Internet via the terminal relay server to connect to the control server.

4. The media streaming home network system according to claim 1, wherein the media client is connected to the Internet by a wire connection to connect to the control server.

5. The media streaming home network system according to claim 1, wherein the media server is a home server connected with at least one electric home appliance through a network constructed in a building, and adapted to perform a control operation for the electric home appliance by transmitting/receiving signals to/from the electric home appliance.

6. The media streaming home network system according to claim 1, wherein the media server comprises:
   a connection request listening unit, which listens for a connection request of the media client transmitted from the control server;
   a routing table detecting unit, which extracts a connection IP address, based on the routing table information stored in the gateway connected to the media client; and
   an access authentication unit, which compares the detected IP address of the media client with the IP address information provided by the control server, thereby performing an authentication process for the media client.

7. The media streaming home network system according to claim 6, wherein the media server further comprises:
 a database which stores software for home networking of electric home appliances and multimedia data to be used for media streaming services.

8. The media streaming home network system according to claim 6, wherein the media server further comprises:
 a controller which generates a control signal for home networking of electric home appliances, and provides a media streaming service to the media client in response to a control message transmitted from the control server under a condition in which the access authentication of the media client has been acquired.

9. The media streaming home network system according to claim 6, wherein the media server further comprises:
 a communication module connected to the media client in a wired or wireless manner to perform data transmission and reception with respect to the media client.

10. The media streaming home network system according to claim 1, wherein the control server comprises:
 a web page driver which provides a web page to allow the media client to input a control message through the web page;
 a network address manager which manages network address information including an IP address of the media client and a port number of the media client under a condition in which the media client is connected to the control server through the web page, and transmits the network address information to the media server;
 a database which stores system information and network status information of the media server under a condition in which the media server is connected to the control server via the Internet; and
 a controller which performs a signal flow control operation to transmit to the media server the control message inputted through the web page.

11. A method for operating a media streaming home network system, comprising:
 accessing a web page provided by a control server by a media client in a dynamic Internet Protocol (IP) environment, and requesting a media streaming service by the media client; transmitting, by the control server, an IP address of the media client, a port number of the media client, and a control message inputted by the media client, to a media server;
 reading, by the media server, routing table information stored in a gateway, which is connected to the media client requesting the media streaming service, and detecting, by the media server, an IP address from the read routing table information;
 comparing, by the media server, the IP address detected from the read routing table information with the IP address transmitted by the control server;
 authenticating, by the media server, an access of the media client to the media server when the IP address detected from the read routing table information is identical to the IP address transmitted by the control server; and
 providing, by the media server, a media streaming service to the access-authenticated media client.

12. The method according to claim 11, wherein accessing the web page comprises:
 accessing, by the media client a terminal relay server adapted to relay connection of the media client to the control server, under a condition in which the media client is connected to the Internet in a wireless manner; and
 acquiring, from the media client, network address information including the IP address and port number of the media client by the terminal relay server.

* * * * *

UNITED STATES PATENT AND TRADEMARK OFFICE
CERTIFICATE OF CORRECTION

PATENT NO. : 7,412,727 B2  Page 1 of 1
APPLICATION NO. : 10/917303
DATED : August 12, 2008
INVENTOR(S) : Pan Su Kim et al.

It is certified that error appears in the above-identified patent and that said Letters Patent is hereby corrected as shown below:

At column 10, line 27 (claim 12, line 3) of the printed patent, after "client" insert -- , --.

Signed and Sealed this

Seventeenth Day of February, 2009

JOHN DOLL
*Acting Director of the United States Patent and Trademark Office*